US012548466B2

(12) United States Patent
Jain et al.

(10) Patent No.: US 12,548,466 B2
(45) Date of Patent: Feb. 10, 2026

(54) ACCESSIBILITY-ENABLED APPLICATION SWITCHING

(71) Applicant: Adobe Inc., San Jose, CA (US)

(72) Inventors: Ajay Jain, San Jose, CA (US); Eric Kienle, Portland, OR (US)

(73) Assignee: Adobe Inc., San Jose, CA (US)

( * ) Notice: Subject to any disclaimer, the term of this patent is extended or adjusted under 35 U.S.C. 154(b) by 341 days.

(21) Appl. No.: 18/368,544

(22) Filed: Sep. 14, 2023

(65) Prior Publication Data
US 2025/0095510 A1    Mar. 20, 2025

(51) Int. Cl.
G09B 21/00    (2006.01)
G06F 21/10    (2013.01)

(52) U.S. Cl.
CPC ........ G09B 21/006 (2013.01); G06F 21/1011 (2023.08)

(58) Field of Classification Search
CPC .................................................... G09B 21/006
See application file for complete search history.

(56) References Cited

U.S. PATENT DOCUMENTS

| | | | | |
|---|---|---|---|---|
| 7,051,096 B1 * | 5/2006 | Krawiec | ............... | G07F 19/206 235/379 |
| 7,620,890 B2 * | 11/2009 | Dietl | ................... | G06F 16/9577 715/767 |
| 11,656,886 B1 * | 5/2023 | Gordon | ................. | G06F 3/0484 715/703 |
| 12,260,235 B2 * | 3/2025 | Bonnet | .................... | G06F 3/167 |
| 2005/0071165 A1 * | 3/2005 | Hofstader | ........... | G10L 13/0335 704/271 |
| 2007/0198945 A1 * | 8/2007 | Sun | ......................... | G06F 3/167 715/779 |

(Continued)

OTHER PUBLICATIONS

World Health Organization, "Blindness and Vision Impairment", Available at https://www.who.int/en/news-room/fact-sheets/detail/blindness-and-visual-impairment , Aug. 10, 2023, 6 pages.

(Continued)

*Primary Examiner* — Peter R Egloff
(74) *Attorney, Agent, or Firm* — Kilpatrick Townsend & Stockton LLP

(57) ABSTRACT

Techniques for accessibility-enabled application switching are provided. In an example method, a processing device receives a status indication of a screen reader browsing content using a first application. The processing device receives a context switch indication from the screen reader, including a designation of a second application as a target application based on context switch accessibility code. The processing device generates a token comprising a client device identifier and identifiers of the source and target applications. The processing device then receives a status indication of the screen reader browsing content using the second application and a second context switch indication. The processing device accesses the token based on the client device identifier and determines the source application. The processing device updates the identifiers of the source and target applications. The processing device then receives a status indication of the screen reader browsing the content using the first application.

20 Claims, 8 Drawing Sheets

(56) References Cited

U.S. PATENT DOCUMENTS

| | | | | |
|---|---|---|---|---|
| 2021/0281675 | A1* | 9/2021 | Michaelis | G06F 3/167 |
| 2024/0379019 | A1* | 11/2024 | Naufel | G06N 3/0895 |
| 2025/0068688 | A1* | 2/2025 | Wen | G06F 9/453 |

OTHER PUBLICATIONS

Juniper Research, "Chatbots to Deliver $11BN in Annueal Cost Savings for Retail, Banking & Healthcare Sectors by 2023", Available at https://www.juniperresearch.com/press/chatbots-to-deliver-11bn-cost-savings-2023, Jul. 3, 2018, 2 pages.

Drift, "2020 State of Conversational Marketing [Free Report]", Available at https://www.drift.com/blog/state-of-conversational-marketing/?utm_source=salesforce&utm_medium=blog, Sep. 14, 2020, 9 pages.

IBM, "AI Chatbot That's Easy to Use", https://www.ibm.com/products/watsonx-assistant/artificial-intelligence, 2023, 10 pages.

Juniper Research, Available at https://www.juniperresearch.com/blog, 2023, 3 pages.

Antalya Region Hotels, "Access iQ: Discovering Antalya's Hospitality Gems: Hotels that Elevate Your Tourism Experience", Available at https://hotelsantalya.net/unveiling-magic-antalya-journey-through-exquisite-hotels/, 2023, 40 pages.

Adobe Experience Cloud Blog, "Lead Management—Definition, process, and best practice", Available at https://business.adobe.com/blog/basics/lead-management, Apr. 26, 2023, 11 pages.

Adobe Experience Cloud, "Leave No Lead Behind with Advanced Lead Management", https://business.adobe.com/products/marketo/lead-management.html, 2023, 9 pages.

* cited by examiner

ACCESSIBILITY-ENABLED APPLICATION SWITCHING

TECHNICAL FIELD

This disclosure generally relates to accessibility and, more specifically, to techniques for accessibility-enabled application switching.

BACKGROUND

Considerations of accessibility in modern computing systems are a pillar of user experience design. For both regulatory, practical, and moral reasons, developing technology through an accessibility-first lens is good both for compliance and for business. Accessibility considerations enter into web application design, particularly with regards to the development of funnels. A funnel generally refers to a series of anticipated user interactions within an application that can lead up to desired outcome or goal, like a conversion such as a sale. In these cases, the funnel may be called a sales funnel.

The need for improved accessibility grows alongside a growth in complexity of modern web applications. For example, funnels associated with some web applications may include an array of information-gathering tools like forms, multimedia features, and chat bots. Chat bots in particular may be a powerful tool for driving user engagement. Funnels may also include applications outside the web browser.

However, the linear design of some web applications coupled with shallow accessibility features means that users dependent on accessibility features, such as the visually challenged, may not even enter the funnel much less complete a conversion. Moreover, funnels that direct users with visual impairments outside the web browser may thereby lack the capability to redirect users back into the funnel upon completion of activities outside the web browser.

SUMMARY

Some embodiments described herein relate to techniques for accessibility-enabled application switching. In an example method, a processing device receives a first status indication of a screen reader browsing first content using a first application. The processing device then receives a first context switch indication from the screen reader, including a first designation of a second application as a target application, in which in the first context switch indication is generated by the screen reader based on context switch accessibility code. The processing device then generates a token including a client device identifier corresponding to the screen reader, a source application identifier, and a target application identifier, in which the source application is the first application, and the target application is the second application. The processing device then receives a second status indication of the screen reader browsing second content using the second application. The processing device then receives a second context switch indication from the screen reader. The processing device then accesses the token based on the client device identifier. The processing device then determines the source application from the token. The processing device then updates the source application identifier and the target application identifier of the token, in which the source application is the second application, and the target application is the first application. The processing device then receives a third status indication of the screen reader browsing the first content using the first application.

In an example system, a processing device processes context switch accessibility code accessed from a first application using a client device configured to cause a context switch selection. The processing device then outputs a first command to cause the context switch selection in the first application. The processing device then receives a first context switch indication including a first selection of a second application. The processing device then generates a token including a client device identifier corresponding to a screen reader, a source application identifier, and a target application identifier, in which the source application is the first application, and the target application is the second application. The processing device then outputs a second command to cause the client device to switch to the second application. The processing device then receives a second indication of a second context selection from the second application including a second selection of the first application. The processing device then accesses the token based on the client device identifier. The processing device then determines the source application from the token. The processing device then updates the source application identifier and the target application identifier of the token, in which the source application is the second application, and the target application is the first application. The processing device then outputs a third command to cause the client device to switch to the first application.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
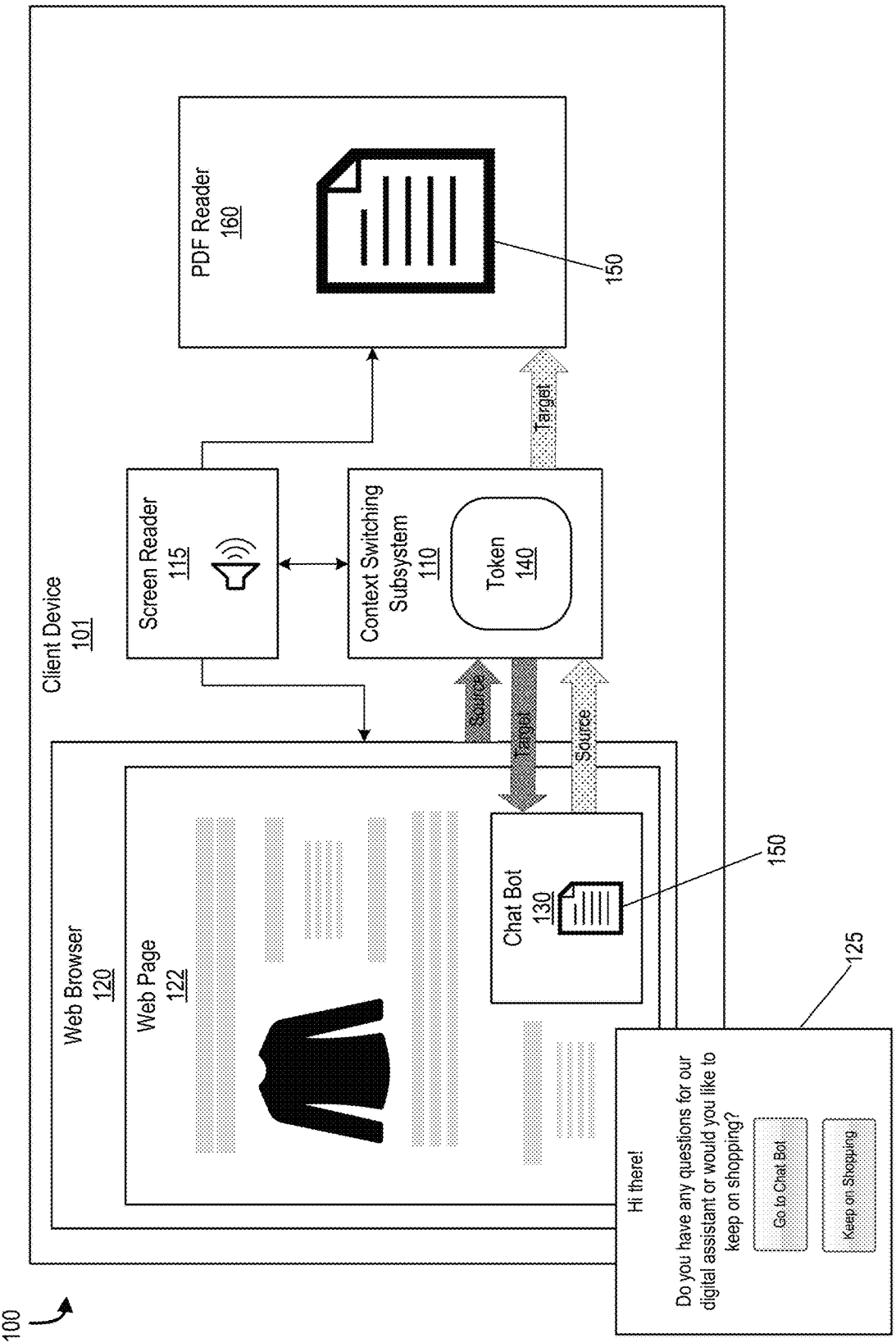
FIG. 1 is a diagram of an example system implementing techniques for accessibility-enabled application switching, according to some aspects of the present disclosure.

The accessibility of a computer application such as a web application refers generally to inclusive design practices that enable individuals with disabilities to perceive, understand, navigate, interact with, and contribute to the application. Accessibility-first software design practices may be implemented for regulatory, economic, and moral reasons. For example, software used in government sectors must generally be compliant with the Americans with Disabilities Act or equivalent legislation in other countries. Moreover, individuals with disabilities are a significant fraction of many target user bases. Therefore, accommodating such users can lead to an improved competitive edge and increased revenues. And perhaps most importantly, software developers may have a moral responsibility to provide accessible software that can enable individuals with disabilities to thrive and access opportunities equally.

However, the aims of well-designed accessible software are not always aligned with the design objectives of a particular application. For example, designers of an e-commerce web application may orient the application around a sales funnel. The term sales funnel generally refers to a metaphor for the way in which potential customers are guided through the sales process. For example, a sales funnel may be designed to guide users toward a conversion through a sequence of persuasive design elements, "calls-to-action," or other strategically placed content. The term conversion generally refers to an event in which a user takes a desired action in response to a call-to-action or other element. Examples may include events such as a user making a purchase, signing up for a newsletter, or filling out a contact form.

The sales funnel may be complex and difficult to interpret without visual cues. For instance, some sales funnels begin with visually stimulating and interactive content intended to capture attention and lead users to specific conversions. The visual hierarchy, interactive elements, animations, and color contrasts might be designed primarily for visual impact, sometimes at the expense of accessibility by individuals with visual impairment.

In contrast, accessibility features may be configured for clarity, simplicity, and predictable navigation. In particular, application designs that are accessible to individuals with visual impairments may rely heavily on linear designs with simple and logically consistent hierarchies. Such designs may be effectively navigable using screen reader technologies. Screen readers may include tools for converting digital text into synthesized speech, thus allowing visually impaired users to listen to written content.

Some popular screen readers include Job Access With Speech (JAWS), Non Visual Desktop Access (NVDA), and Windows Narrator. For example, some screen readers may read web pages by navigating HTML, such as headings, links, form fields, buttons, and other interactive elements, in a linear fashion. The screen reader may also convey semantic information, such as information about previously visited links or row and columns headers in a table.

One effective element found in some sales funnel strategies is a chat bot. A chat bot may be a software tool designed facilitate chat-based conversations with real (i.e., human) or synthetic (i.e., AI-based) partners. Such tools may be used to answer questions, facilitate transactions, and generally direct the user towards a conversion. However, the chat bot may be typically found lower in the sales funnel, after several other potential events or calls-to-action. For instance, a UI element indicative of the availability of a chat bot may be shown to a user after the user has browsed products or read reviews. Or the UI element indicative of the availability of a chat bot may be located at the bottom or bottom corner of the web page to be non-obtrusive for sighted users.

However, for a user with a visual impairment that is navigating such a web application using a screen reader, several elements may first need to be traversed using the screen reader before the user is even aware of the chat bot. In these cases, users with a visual impairment may depart the sales funnel (e.g., leave the web page) before the chat bot is engaged. Because the chat bot and other applications may be important tools for obtaining conversions, the linear and hierarchical nature of web pages in concert with screen reading technology can lead to lost opportunities.

Techniques for accessibility-enabled application switching are provided to improve conversion rates associated with users with visual impairments using screen reading technology. In an example method, a processing device receives a status indication of a screen reader browsing first content using a first application. For example, a client device may include a screen reader such as JAWS. In a typical scenario, a user with a visual impairment may use a screen reader to access the web to, for example, browse an e-commerce web application. The e-commerce web application may include several components, such as components for browsing products or purchasing products, a shopping cart, a chat bot, and so on.

The user with the visual impairment may navigate the e-commerce web application using the screen reader. For example, the user may move from one element to the next in a linear fashion while the screen reader synthesizes speech that is descriptive of each element. The screen reader may make use of HTML, Accessible Rich Internet Applications (ARIA) tags, or other clues to generate speech to audible navigation of the e-commerce web application. The screen reader may provide an indication to the processing device of its status, including the application in use (i.e., the web browser), the location within the current web page, the type or details of the content currently being browsed, and so on.

The processing device next receives a context switch indication from the screen reader, including a designation of a second application as a target application. The context switch indication is generated by the screen reader based on context switch accessibility code encountered while browsing. For example, the e-commerce web application may include JavaScript code in a component for product browsing such as a product description page that can detect a screen reader. The product description page may include elements such as the product title, images of the product, price, or description text, as well as user interface controls for making purchases, saving items for later purchase, adding reviews, etc. Upon detection of a screen reader, the JavaScript code can present the user of the screen reader with a dialog box that includes a selection control for switching contexts. One example of a context switch may be switching from browsing a product description page to the chat bot component. An opportunity to make such a selection may be particularly useful for a user with a visual impairment using a screen reader, because they may otherwise not become aware of the chat bot. Once the user makes a selection, the processing device receives the context switch indication that includes information such as which target application was selected. In this example, the user may select either the chat bot or to continue browsing the product description page. The JavaScript code may cause the context to switch in accordance with the user's selection.

The processing device generates a token including a client device identifier corresponding to the screen reader, a source application identifier, and a target application identifier. The source application is the first application and the target application is the second application. In this example, the user has selected the chat bot as the target application. The processing device may thus construct a token, such as a text string, that includes information describing the trajectory of the user for effective, accessibility navigation among different contexts.

The token may include information such as a text string that identifies the screen reader as a means for identifying the user. For instance, the screen reader may provide a unique identifying string or MAC address. The token may also include information about the source and target applications, in this example, the product description page of the e-commerce website and the chat bot, respectively. In some examples, the token can include additional context such as details that specify location within websites, partially filled out forms, pending web requests, and so on.

The processing device later receives a second status indication of the screen reader browsing second content using the second application. For example, if the user switches contexts to the chat bot application, the screen reader may be used to interface with the chat bot for a period of time. The screen reader may provide an indication to the processing device of its status, including the application in use (i.e., the chat bot), current activities within the chat bot, information indicative of ongoing use of the chat bot, and so on.

The processing device receives another context switch indication from the screen reader. For example, in the example where the user with a visual impairment is using the chat bot, the user may complete operations with the chat bot. The user may say as much or may operate a control, such as an exit button, so indicate that his or her operations with the chat bot are complete. The chat bot may be configured, using context switch accessibility code or other JavaScript code, to provide the context switch indication to the processing device. In some examples, the indication may be transparent to the user.

In some other examples, the indication may again be responsive to a selection made using a dialog box or other suitable user interface control. In that case, the user may be given a selection to change contexts to a third application, such as a PDF reader. The token can be used to store nested source/target application pairs. For instance, the user can change contexts from the chat bot to the PDF reader. Once the user has completed operations in the PDF reader, they may restore their context to the chat bot, and then restore their context to the original product description page.

To execute the context switch corresponding to the context switch indication, the processing device accesses the token based on the client device identifier. For example, the token may be stored in a database or in-memory key-value storage indexed according to client device identifiers such as an identifier of the screen reader. This value can be used to look up the appropriate token.

The token includes information needed to seamlessly restore the user to his or her prior context. As discussed above, the token may include information describing the context the user came from (i.e., the source application) including contextual information about what the user was doing, where they were, and so on. The processing device determines the source application from the token, which corresponds to the context the user desires to return to. JavaScript code or other suitable mechanism can be used to change the context of the user back to the source application, including restoring any additional context, such as a precise location. In this example, the user may be returned to the product description page where the user can continue browsing.

The processing device updates the source application identifier and the target application identifier of the token, wherein the source application is the second application, and the target application is the first application. In this example, the roles of the product description page and the chat bot are thus now reversed. In the event additional JavaScript code or other context switch accessibility code is encountered for switching contexts back to the chat bot, the token can be similarly used to restore the context back to the chat bot, which is now the source application. The processing device receives another status indication of the screen reader browsing the content using the first application. The screen reader thus again can provide an indication to the processing device of its status, including the application in use (i.e., the web browser), the location within the current web page, the type or details of the content currently being browsed, and so on.

The innovations of the present disclosure are a significant improvement to the technical fields of accessibility and in particular, accessible application development. Even with tools such as screen readers, users with visual impairments may be restricted by hierarchies that emerge naturally from the program code used to make websites and web applications. For example, HTML is a naturally hierarchical markup language that may correspond to the physical layout of elements on a webpage. A user with a visual impairment browsing such a hierarchy linearly may, in some cases, not become aware of elements farther along the linear path before deciding to abandon the webpage. The techniques of the present disclosure thus provide a discoverability mechanism for such elements and ensure that users with visual impairments or other disabilities have the same opportunity to use all elements of a web page or web application before leaving, thus restoring an equality of opportunity. Such a paradigm is also of benefit to the website host or marketer, who may desire to keep the user in the sales funnel by providing an opportunity to correspond with the user using the chat bot before leaving the webpage.

In addition, the present disclosure includes techniques for tracking information about source and target applications, including nested source and target applications, that can enable users with visual impairments to navigate between and among applications without a loss of context. For instance, a user with a visual impairment can switch contexts from a web page to a chat bot, from the chat bot to a PDF reader, back to the chat bot, and then back to the web page, in each case returning to the location they departed as well as restoring other context. The techniques leverage the ubiquitous screen reader to provide capabilities for users with visually impairments that come naturally to the sighted but are absent from existing technique for the visually impaired.

Overview

FIG. 1 is a diagram of an example system 100 implementing techniques for accessibility-enabled application switching. Example system 100 includes a client device 101 that can be used for various applications such as web browsing, reading, shopping, and so forth. The client device 101 may be a laptop, desktop, smartphone, tablet, or any other suitable device for executing client software for particular applications in accordance with user needs.

Not all users of the client device 101 are identically abled. Some users, for instance, may have disabilities that result in visual impairment. Such users may rely on assistive technologies, such as screen reader 115, to interact with digital content. The screen reader 115 can convert textual and visual data into audible speech, enabling users with visual impairments to comprehend and navigate web pages or other applications. The screen reader 115 may rely on coding practices, such as semantic Hypertext Markup Language (HTML) or use of Accessible Rich Internet Application (ARIA) tags for effective parsing and communication of content.

The client device 101 may include a web browser 120 that can be used to browse web pages, such as web page 122. For example, the web page 122 may be a user interface for a web application that is used for e-commerce. In this example, the web page 122 comprises a product description page for an e-commerce website that is used for selling clothes. However, it will be apparent to one of ordinary skill in the art that the techniques described herein are applicable to a variety of web contexts or other online and offline applications.

In a typical scenario, a user with a visual impairment may use the screen reader 115 to browse the web page 122. The elements of the web page 122 may be organized hierarchically or linearly such that some elements may be perceptibly delayed in an audible rendition of the web page 122 as rendered by screen reader 115. For example, the web page 122 includes a web browser chat application such as a chat bot application 130. The chat bot application 130 may be a standalone application or it may be embedded into the web page 122 as depicted in FIG. 1. The chat bot 130 may be situated on the web page 122 such that it is visually apparent to a sighted user but may not be encountered by a user with a visual impairment using a screen reader 115 until browsing through numerous unrelated elements.

The system 100 includes a context switching subsystem 110. The context switching subsystem 110 may be a standalone component of the client device 101 or a component of the screen reader 115. For example, the screen reader 115 may start the context switching subsystem 110 at startup which runs in the background on client device 101. The context switching subsystem 110 includes components for receiving indications of screen reader 115 status, context switch selections, token 140 generation, and token 140 storage, among other functions. The context switching subsystem 110 will be discussed in more detail in FIG. 2 and the accompanying description.

As the user with a visual impairment browses the web page 122 using the screen reader 115, the screen reader 115 may send a status indication to the context switching subsystem 110. The status indication may be, for example, information about the web page 122 including the URL, the location within the web page 122, browser storage or cookies, and so on. Similar status indications may be sent to the context switching subsystem 110 by the screen reader 115 when the screen reader is used with other applications. For instance, the screen reader 115 may be used with PDF reader 160 for audible navigation of PDF document(s) 150. In that case, the screen reader 115 may send a status indication to the context switching subsystem 110 including information such as the document 150 name or filesystem location, the location within the document 150, metadata, and so on.

The web page 122 may include context switch accessibility code among the HTML, JavaScript, CSS, etc. used to render the web page 122. The context switch accessibility code can be used to generate a context switch selection dialog that can be audibly presented to the user when the context switch accessibility code detects that the screen reader 115 is in use or other indicia of a user with a visual impairment is detected.

For instance, in some examples the context switch accessibility code may be JavaScript code that infers the presence of a screen reader 115 through behaviors and metadata such as the use of certain ARIA roles or properties or the detection of rapid keyboard events without mouse events (e.g., repeated tabbing). In another example, the context switch accessibility code runs outside the context of a web browser 120. In that case, the presence of a screen reader 115 may be detected by checking for running processes to determine if a specific screen reader, such as JAWS or NVDA, is active.

The context switch accessibility code may be triggered by a new web page 122 load or refresh or when particular conditions are met, such as the detection of a chat bot 130 application in the context of a web page 122. The context switch accessibility code may cause a context switch selection dialog 125 to be presented to the user with a visual impairment immediately or shortly after navigation of the web page 122 has begun. For instance, the context switch accessibility code may be configured to display the context switch selection dialog 125 after a certain amount of time, e.g., one minute, has elapsed or until after a particular user interface (UI) element in the web page 122 has been navigated past.

The context switch selection dialog 125 is depicted with an example UI control containing a description of the selection. In this example, the user is presented with an option to continue shopping or to move directly to the chat bot 130. The context switch selection dialog 125 may be presented to the user by the screen reader 115.

Upon making a selection, an indication of the selection may be sent from the screen reader 115 to the context switching subsystem 110. In the event the user opts for a context switch (e.g., to move to the chat bot 130), the indication may include, for example, information that specifies the source application and a target application. In this example in which the user begins in the web browser 120 and elects to move to the chat bot 130, the source application is the web browser 120 and the target application is the chat bot 130. The source and target application designations may be specified using process IDs, executable names, environment variables, or any other suitable means for identifying the applications or contexts at a later time.

Upon receipt of a context switch selection, the context switching subsystem 110 can generate a token 140. The token 140 can be used for persisting information about the context switch so that the original context can be restored. For example, after performing some operations using the target application for a period of time, the user may wish to return to the source application. The token 140 may include information necessary to restore the source application context. The token 140 may include a client device 101 identifier or a screen reader 115 identifier, a source application identifier (e.g., the web browser 120), and a target application identifier (e.g., the chat bot 130).

In another example, the chat bot 130 can generate a context switch selection for switching contexts to another application, like a PDF reader 160. In a typical scenario, the chat bot 130 may send the user or provide access (e.g., by way of a hyperlink) to a document 150 that can be viewed in PDF reader 160. For example, if the user is shopping on the web page 122, the document 150 may be offered to provide additional information about items of interest. However, other vectors for entry into other contexts or applications are also possible. The chat bot 130, for example, may provide or provide access to videos, audio, word processing documents, etc., each of which may cause another application to be designated as a target application.

In this example, the chat bot 130 presents the user with a document 150 which may appear in chat bot 130 interface as an icon to click or other representation. The user can click the document 150 representation which may cause a mechanism of the client device 101 to change the context to the PDF reader 160, including automatically loading the document 150 for viewing using the screen reader 115. For instance, the client device 101 may be configured to automatically open the PDF reader 160 upon selection of PDF documents 150. The screen reader 115 may be similarly configured to provide accessibility services for multiple applications including the web browser 120, the PDF reader 160, and others.

Upon receipt of a context switch selection, the context switching subsystem 110 accesses the token 140 generated during the previous context switch. For example, the token 140 may include a client device 101 identifier or a screen reader 115 identifier that can used to look up the appropriate token. The token 140 may be updated by the context switching subsystem 110 such that the source application is now the chat bot 130 and the target application is the PDF reader 160. In some examples, the token 140 may include nested application identifiers. For instance, the token 140 may include a tertiary identifier that can be a nested target application. Nested applications can thus be used to maintain context for multiple prior source applications.

The context switching subsystem 110 again may receive a status indication of the screen reader 115 browsing content, in this example, the PDF reader 160 browsing document 150. A context switch selection may again be caused by the screen reader 115 under certain circumstances. For example, the PDF reader 160 may be configured to cause the screen reader 115 to generate a context switch selection upon the user reaching the end of the document 150 or after the passage of a designated period of time. The user may elect to return to the previous context (e.g., the chat bot 130) or to remain in the PDF reader 160.

If the user elects to return to the previous context, the context switching subsystem 110 again accesses the token 140 generated during the previous context switch using a suitable identifier. The context switching subsystem 110 determines the source application from the token 140 and can cause a restoration of the source application context in accordance with the information included in the token 140. For example, if the PDF reader 160 is the target application and the chat bot 130 is the source application, the context switching subsystem 110 may return the user to the chat bot 130. In some examples, the token 140 may contain additional contextual information that can be used to, for instance, restore the dialog that was previously displayed in the chat bot 130 or other contexts. Upon restoration of the source application context, the context switching subsystem 110 again may receive a status indication of the screen reader 115 browsing content, in this example, the interactions of the user with the chat bot 130.

Context Switching

Figure 2:
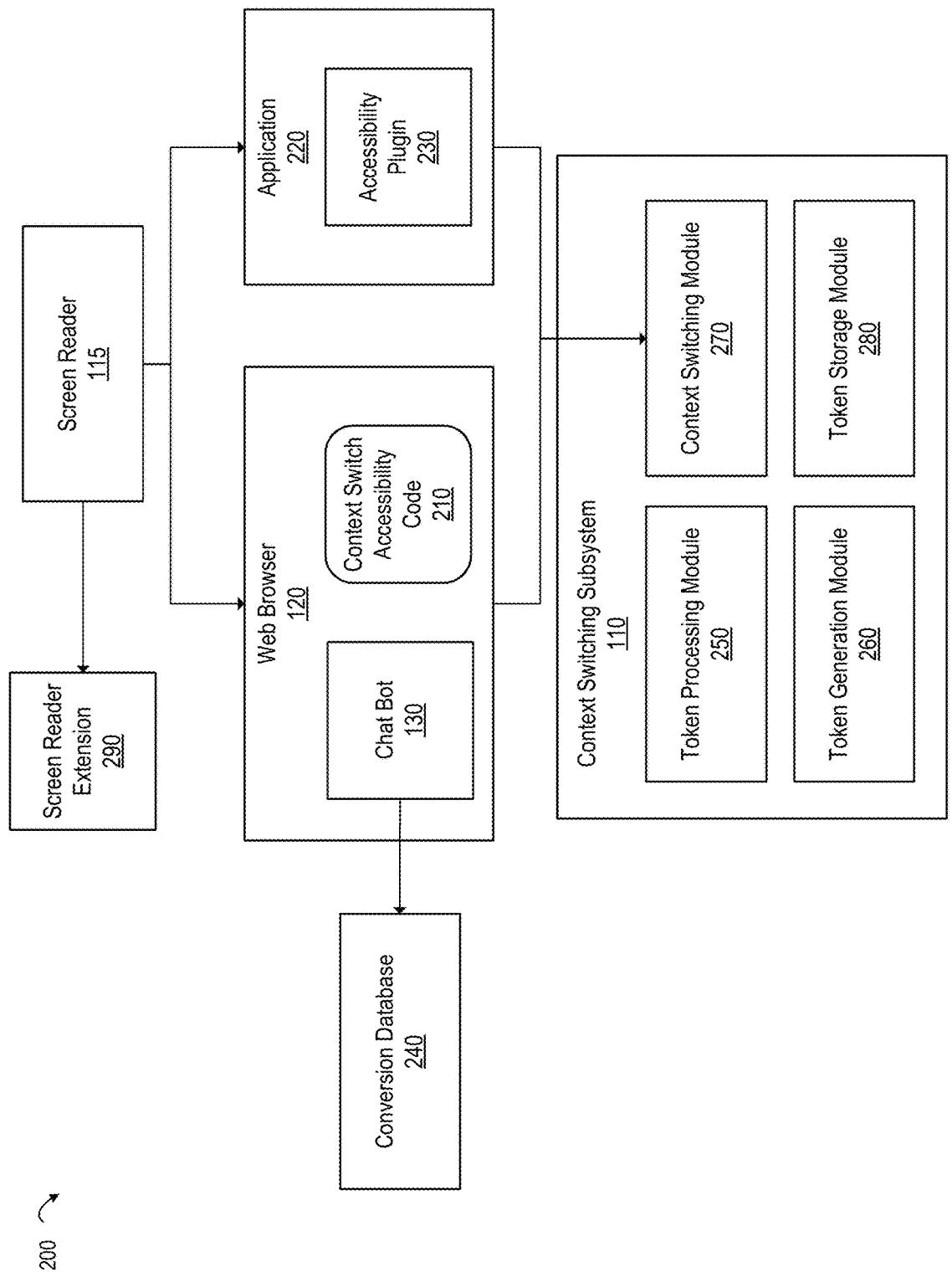
FIG. 2 shows an example system implementing techniques for accessibility-enabled application switching, according to some aspects of the present disclosure.

FIG. 2 shows an example system 200 implementing techniques for accessibility-enabled application switching. System 200 includes detail of an example implementation of a context switching subsystem 110 executing on client device 101. The context switching subsystem 110 may be implemented in software, hardware, or a combination of both. The context switching subsystem 110 may be a component of the screen reader 115 or a standalone process or program executing on the client device 101. In some examples, the context switching subsystem 110 may be provided on an external, remote server or cloud provider.

As discussed in the example system 100, the screen reader 115 can provide accessibility services for various applications executing on the client device 101 such as the web browser 120 or application 220. The application 220 may be any application that may benefit from the transcription or synthesis of visual content into audible content for users with visual impairments including PDF readers, e-book readers, video games, word processors, code editors, and so on. The techniques of the present disclosure can be used for context switching between any application 220 that can execute context switch accessibility code 210 or include modified behavior for accessibility-enabled application switching using, for instance, a plugin or other extension mechanism. Thus, context switching between and among online applications such as web browser 120 or chat bot 130 and offline applications 220 such as PDF readers 160, word processors, image editors, music players, and so on, may be possible.

In some examples, the screen reader 115 may include an extension 290 for implementing the techniques described herein. For example, some commercial screen readers 115 may include an extension or plugin API for extending the capabilities of the screen reader 115. The screen reader 115 can be configured, using extension 290, to implement certain elements of the present disclosure such as context switching selection. However, some examples may instead rely on the standard capabilities of screen readers 115 and implement context switching externally using, for instance, context switch accessibility code 210 or an accessibility plugin 230 for an application 220. For example, the accessibility plugin 230 may be a plugin for a PDF reader 160 developed using an API provided by the PDF reader 160 that enables certain context switch selections in accordance with the present disclosure. For instance, a plugin 230 for a PDF reader 160 may be configured to cause a context switch selection upon reaching the end of a PDF document 150.

In a typical scenario, a user with a visual impairment will begin the context switching process in a web browser 120. Upon the screen reader 115 encountering the context switch accessibility code 210, the context may be switched to the chat bot 130 or other application 220. For instance, the web browser 120 may be used to browse a web page 122 for e-commerce. For a user with a visual impairment, the context switch accessibility code 210 may provide an opportunity early in the linear browsing experience using screen reader 115 to context switch to the chat bot 130.

Chat bot 130 may include a human- or bot-operated interlocuter. The interlocuter may have objectives such as helping the user with usability issues on the web page 122, answering questions related to the web page 122, or increasing the likelihood of a conversion. For example, the interlocuter may be tasked or configured to gather information related to a sales funnel or to gather information for establishing and nurturing potential sales leads. The chat bot 130 may be communicatively coupled with conversion database 240 that includes persisted information relating to information gathered during chat bot 130 operations.

Context switching subsystem 110 includes components for receiving indications of screen reader 115 status, context switch selections, token 140 generation, and token 140 storage, among other functions. Context switching subsystem 110 includes context switching module 270. The context switching module 270 receives the context switch indications from the screen reader and coordinates generation of, retrieval of, and updating of tokens. For example, an indication of a context switch selection may be received by the context switching module 270. The context switching module 270 may determine the client device 101 or screen reader 115 identifier, a source application identifier, and a target application identifier from the indication and use the information for token generation by token generation module 260, token lookup by token storage module 280, or token updating or processing by token processing module 250. The context switching module 270 can also send information determined from retrieved or updated tokens to the screen reader 115 or client device 101.

Context switching subsystem 110 includes token generation module 260. Token generation module 260 can generate tokens for storing information about context switches and their associated devices and applications. The token 140 can be used for persisting information about the context switch so that the original context can be restored. For example, after performing some operations using the target application for a period of time, the user may wish to return to the source application. The token 140 may include information necessary to restore the source application context. The token 140 may include a client device 101 or screen reader 115 identifier, a source application identifier (e.g., the web browser 120), and a target application identifier (e.g., the chat bot 130).

Figure 3:
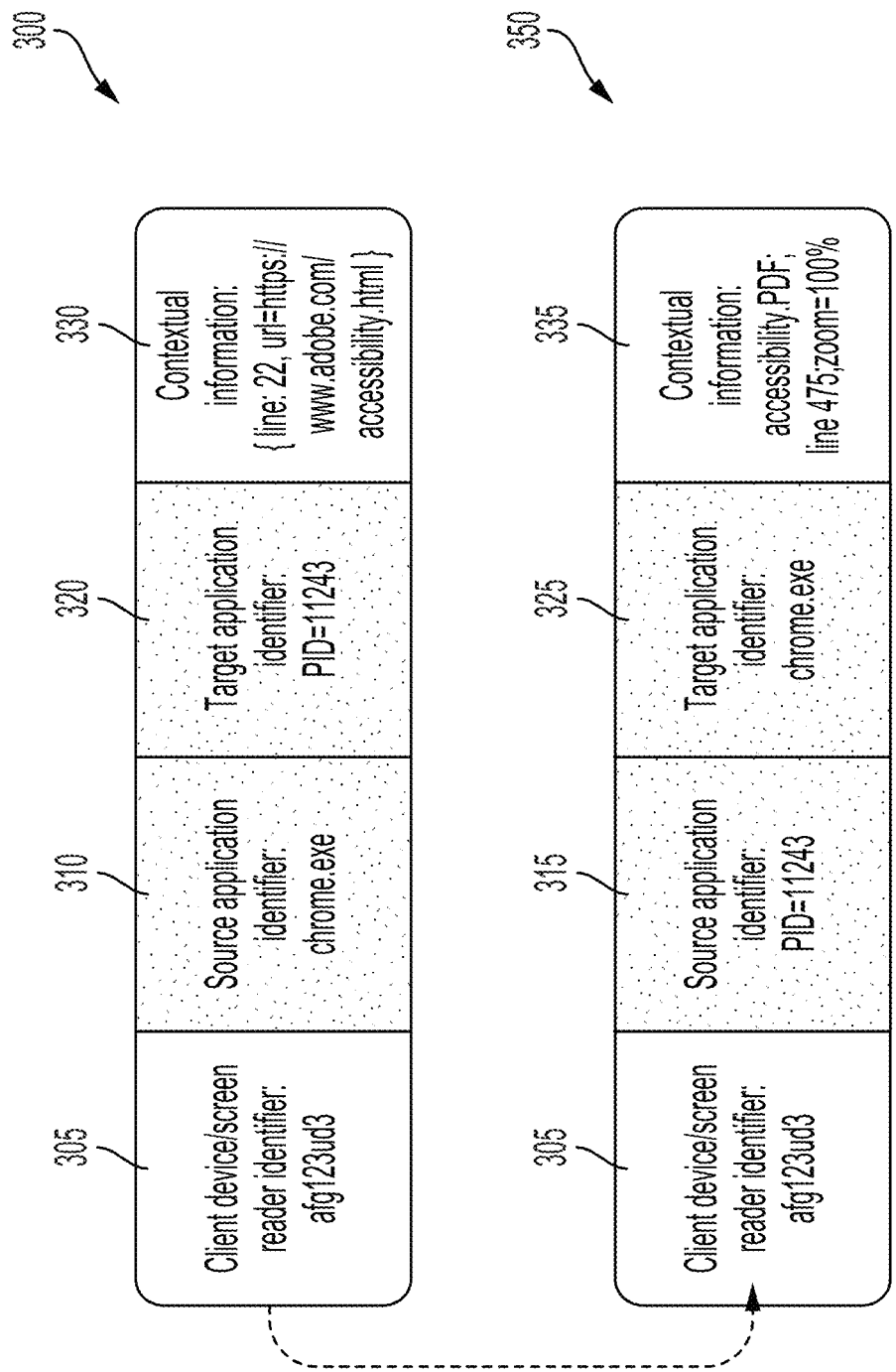
FIG. 3 shows an example of a token that may be generated by certain components, according to some aspects of the present disclosure.

FIG. 3 shows an example of a token 300 that may be generated by token generation module 260. For example, generated tokens 300 may include information necessary to restore the source application context or a nested application context. The token 300 may include a token ID 305 that is a client device 101 or screen reader 115 identifier. For instance, the client device 101 may have an identifier that is sufficient to uniquely identify it in the relevant identifier parameter spaces. Possible identifiers for this application may include a device serial number, IP address, MAC address, a generated GUID, and so on. Similarly, the token ID 305 may be an identifier of the screen reader 115 in cases where the screen reader 115 is unique to a given client device 101. Again, possible identifiers of the screen reader 115 can include device serial number, IP address, MAC address, sui generis generated GUIDs, and so on.

The token 300 includes a source application identifier 310 and a target application identifier 320. The source application identifier 310 and target application identifier 320 can be any suitable identifier for the source and target applications. Examples include program names, process names, process IDs, executable names, filesystem links or references, interrupts, and so on.

The token 300 includes a contextual identifier 330. The contextual identifier 330 can be an unstructured or semi-structured text field used to store the context of the source application. For example, upon changing contexts from the web browser 120 to the chat bot 130 and then back to the web browser 120, the user may desire to restore the context of the source application before the context was originally changed. This may include things such as location within a web page 122, cookies, URL, partially filled out forms, operations in progress, and so on. The source application may be configured to provide context via context switch accessibility code 210 that may be subsequently used upon restoration of context. The contextual identifier 330 may be, for example, a JavaScript Object Notation (JSON) object that specifies details needed to restore a web page 122 session that existed prior to a context switch to a chat bot 130.

FIG. 3 also shows an example token 350 following a context switch. The token ID 305 remains the same following the context switch, as the same client device 101 or screen reader 115 is in use. In the event a device changes between context switches, such as from a desktop to a smartphone, the token generation module 260 may also update the token ID. The source application identifier 315 has been updated to reflect a new source application, the chat bot 130. Likewise, the target application identifier 325 has been updated to reflect a new target application, the PDF reader 160. The contextual identifier 330 may be similarly updated to reflect the contextual information of the new source application, the chat bot 130.

In some examples, nested source/target application pairs may be possible. For instance, the token 300 may include a tertiary application identifier and so on. In that case, two or more pairs of source/target applications and their associated contextual identifiers may be stored in the token 300, 350. Upon restoring contexts, the most recent source/target pair are typically used. In that case, the token 300, 350 functions like a first-in-first-out (FIFO) queue or stack and the most recent pair may be "popped."

In some examples, the token 300 may be stored as an alphanumeric string with each part concatenated. For example, the token ID 305, source application identifier 310, target application identifier 320, and contextual identifier 330 may themselves be alphanumeric strings. The token generation module 260 may concatenate these strings and in some cases, remove whitespace. In some examples, the concatenated objects may be encoded using a suitable encoding mechanism for compressed storage and transmission such as Base 64 encoding or various forms of text compression.

In a simple example, the token ID 305 is "afg123ud3," the source application identifier 310 is "chrome.exe," the target application identifier 320 is "PID=11243," and the contextual identifier 330 is "{line: 22, url=https://www.adobe.com/accessibility.html}." These 4 values may be concatenated to form a plaintext token 300 such as "abcd1234; chrome.exe; PID=11243; {line: 22, url=https://www.adobe.com/accessibility.html}," in which the concatenated values are delimited by an arbitrary delimiter such as a semicolon. The token, in some implementations, may be Base 64 encoded for ease of transmissibility and privacy. In that case, the token may be written as "YWJjZDE-yMzQ7Y2hyb21lLmV4ZTtQSUQ9M-TEyNDM7eyBsaW5lOiAyMiwgdXJsPWh0d HBzOi8vd3d3LmFkb2JlLmNvbS9hY2Nlc3NpYmls-aXR5Lmh0bWwgfQ==". Alternatives to Base 64 encoding include URL encoding, MIME encoding, hexadecimal encoding, compression algorithms, or encryption algorithms.

Returning to FIG. 2, the context switching subsystem 110 includes token storage module 280. For example, upon generation of a token such as token 300 by token generation module 260, the token may be stored by token storage module 280. In a typical implementation, the stored token 300 can be indexed using the token ID 305 as a primary key or lookup value. The token storage module 280 may be an in-memory key-value store, such as Redis, but may also be a traditional database, suitable for persistent storage, such as a relational, SQL-based database. A combination of the two persistence mechanisms may be used in some examples. For instance, the in-memory store may be used for normal operations, while also backed up to disk or persisted in a database for restoration of state following a crash or restart of client device 101 or screen reader 115.

Context switching subsystem 110 includes token processing module 250. The token processing module 250 receives requests to update the token 300 when, for example, context is changed following generation and storage of a token 300. The token processing module 250 may also extract information from the token 300. For example, the token processing module 250 may expose an API endpoint that can be used to look up source application identifiers, target application identifiers, nested application identifiers, contextual information, and so on, as a function of token ID 305. The token processing module 250 may retrieve the token 300 from token storage module 280 by token ID 305, decode or decompress if necessary, parse, and extract the requested information.

Processes for Accessibility-Enabled Application Switching

Figure 4A:
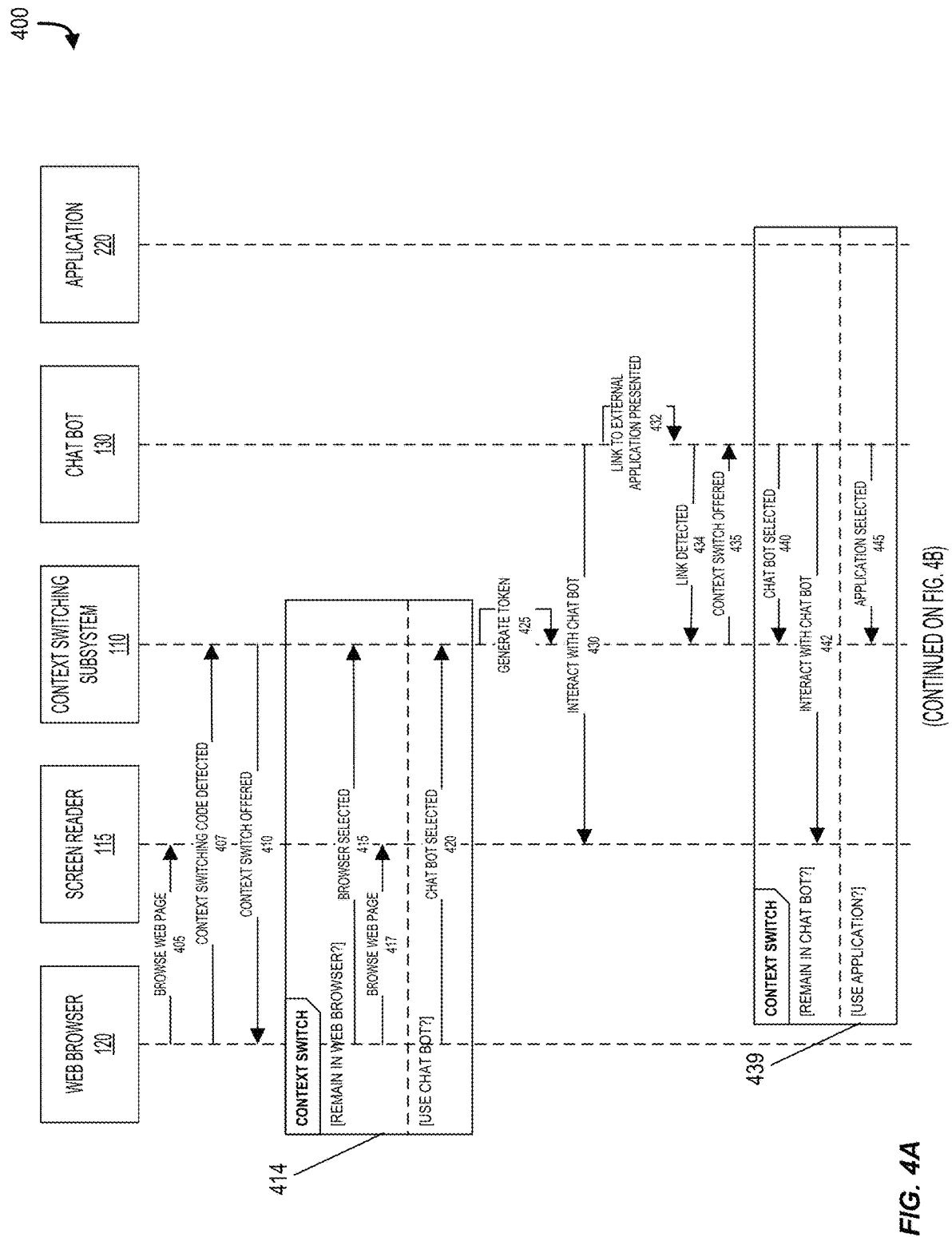
FIG. 4A depicts the first part of a sequence diagram of several components involved with accessibility-enabled application switching, according to some aspects of the present disclosure.
Figure 4B:
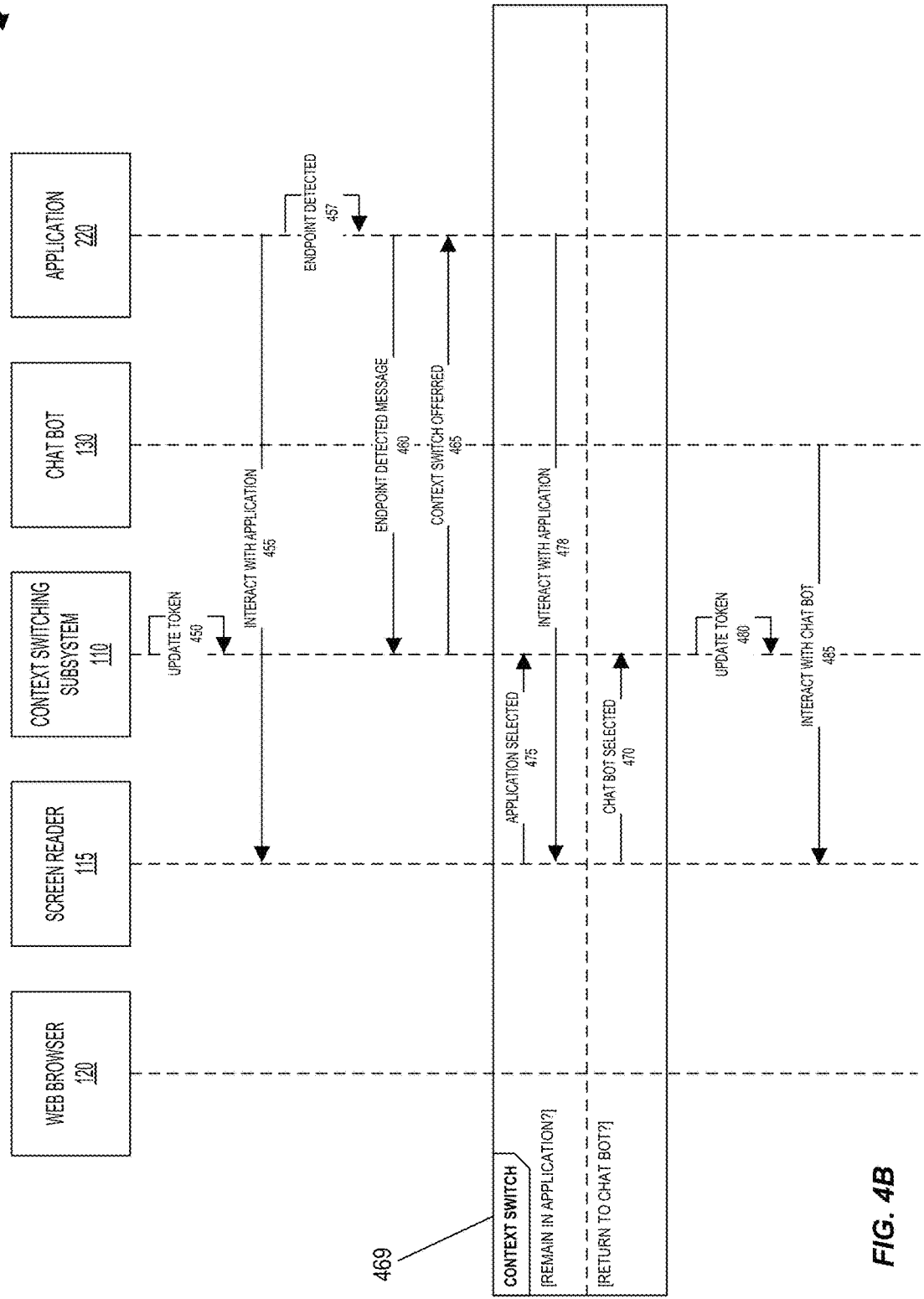
FIG. 4B depicts the second part of a sequence diagram of several components involved with accessibility-enabled application switching, according to some aspects of the present disclosure.

Turning now to FIGS. 4A-B, FIGS. 4A-B contain a sequence diagram 400 depicting interactions between the web browser 120, the screen reader 115, the context switching subsystem 110, the chat bot 130, and another application 220, such as a PDF reader 160. Sequence diagram 400 shows an example sequence of interactions among these components, according to some aspects of the present disclosure. In sequence diagram 400, a "nested" context switch is illustrated involving a two context switches followed by a return to a previous context. Sequence diagram 400 will be described using certain elements of FIGS. 1-3 by way of example, but other implementations are also possible.

At 405, the user with a visual impairment is browsing a web page 122. For instance, the user may be browsing a product description page on an e-commerce website and considering making a purchase. The screen reader 115 provides audible indications for facilitating browsing, but control of browsing is affected by web browser 120. At 407, context switch accessibility code 210 may be encountered during the course of browsing, which can cause a message to be passed to the context switching subsystem 110 to cause the context switching subsystem 110 to "offer" a context switch to the user at 410. In some examples, as when the context switching subsystem 110 is a standalone process, the context switching subsystem 110 may provide an indication of the offered context switch directly to the web browser 120, as shown. However, in some other examples, the context switching subsystem 110 may provide the indication via screen reader 115 such as when the context switching subsystem 110 is a component of the screen reader. In that case, the context switch selection may be received from the screen reader 115. The example shown in sequence diagram 400 illustrates a case in which the indication of the offered context switch is sent to the web browser 120 (and chat bot 130 and application 220, as discussed below).

Offering the context switch may subsequently cause a control such as the context switch selection dialog 125 to be presented to the user, which can be interacted with using screen reader 115. The offered context switch is represented in sequence diagram 400 as box 414, which presents two possible outcomes. However, some implementations may offer more than two choices during context switch selections. The user may elect to remain in the web browser 120 or to move to the chat bot 130. At 415, context switching subsystem 110 is notified that the web browser 120 is selected and the user continues to browser the web page 122 as before, remaining in the linear or hierarchical layout of the web page 122 using screen reader 115, at 417. The sequence diagram 400 there ends for this path, although additional context switches may still be possible later.

At 420, the alternative path is selected using context switch selection dialog 125 and context switching subsystem 110 is notified that the user selects the chat bot 130. The context switching subsystem 110 receives this context switch indication from the web browser 120 (or the screen reader 115 in some implementations). The indication may include a designation of the chat bot 130 as the target application by process ID, name, URL etc.

Upon receipt of the indication, the context switching subsystem 110 generates a token 140 at 425, similar to the ones discussed in FIG. 3 and the accompanying description. The token 140 can include, for instance, information identifying the user, client device 101, or screen reader 115. Subsequent to or in parallel with token 140 generation, the context of the user is changed to the chat bot 130. For example, the context switch accessibility code 210 may include program code for changing the context of the user to the chat bot 130. In some other examples, the screen reader 115 may cause the context switch based on instructions received from the context switching subsystem 110.

At 430, the user interacts with the chat bot 130 using screen reader 115. For example, in an e-commerce scenario, the chat bot 130 may be human- or bot-controlled and may be configured to gather information about the user and answer questions. In some examples, the system 100 is configured to optimize the conversion rate, such as the number of "leads" obtained, where a lead includes sufficient information about the user to follow up if the user leaves the web page 122.

At 432, a link to an external application 220 is presented to the user by chat bot 130. For example, the chat bot 130 may present the user with a link to a file or attachment such as a PDF document 150. The PDF document 150 may contain additional information or details about subjects of the web page 122. At 434, the link is detected by the chat bot 130, and a message is sent to context switching subsystem 110 including information about the link or document 150. At 435, the context switching subsystem 110 offers chat bot 130 a context switch 439. For instance, the chat bot 130 may present the user with a link to a file or attachment such as a PDF document 150. At 439, the user is offered a second context switch. In this example, the second context switch is represented in sequence diagram 400 as a box 439 with two possible outcomes. At 440 the context switching subsystem 110 is notified that the user elects to remain in the chat bot 130. At 442 the user continues to interact with the chat bot 130 using screen reader 115 and the sequence diagram 400 ends for this path, although additional context switches may still be possible later.

At 445 the alternative path is selected and the context switching subsystem 110 is notified that the user indicates a selection of the application 220 by, for example, clicking the link or attachment. Continuing the example, the application 220 may be the PDF reader 160 for reading the document 150. At 450, the token is updated such that the source application is now the chat bot 130 and the target application is the PDF reader 160. At 455, the user interacts with the application 220/PDF reader 160 by, for instance, reading the PDF document 150 via screen reader 115. In some examples, the token 140 includes additional application identifiers corresponding to nested applications. For example, the token 140 may be configured to include a first source and a first target, a second source and second target, and so on.

At 457, an endpoint for interaction with application 220 is detected by the application 220. For example, the PDF reader 160 may determine that the end of the PDF document 150 has been reached by detecting an end of file marker of the PDF document 150. At 460, the application 220 sends a message to the context switching subsystem 110 including information that the endpoint of the interaction with application 220 has been detected. In some examples, the PDF reader 160 or application 220 may be configured to detect interaction endpoints by way or a plugin 230 or extension mechanism. Such an extension may include modifications to the configuration or settings screen of the PDF reader 160 or application 220 as is illustrated in FIG. 5.

Figure 5:
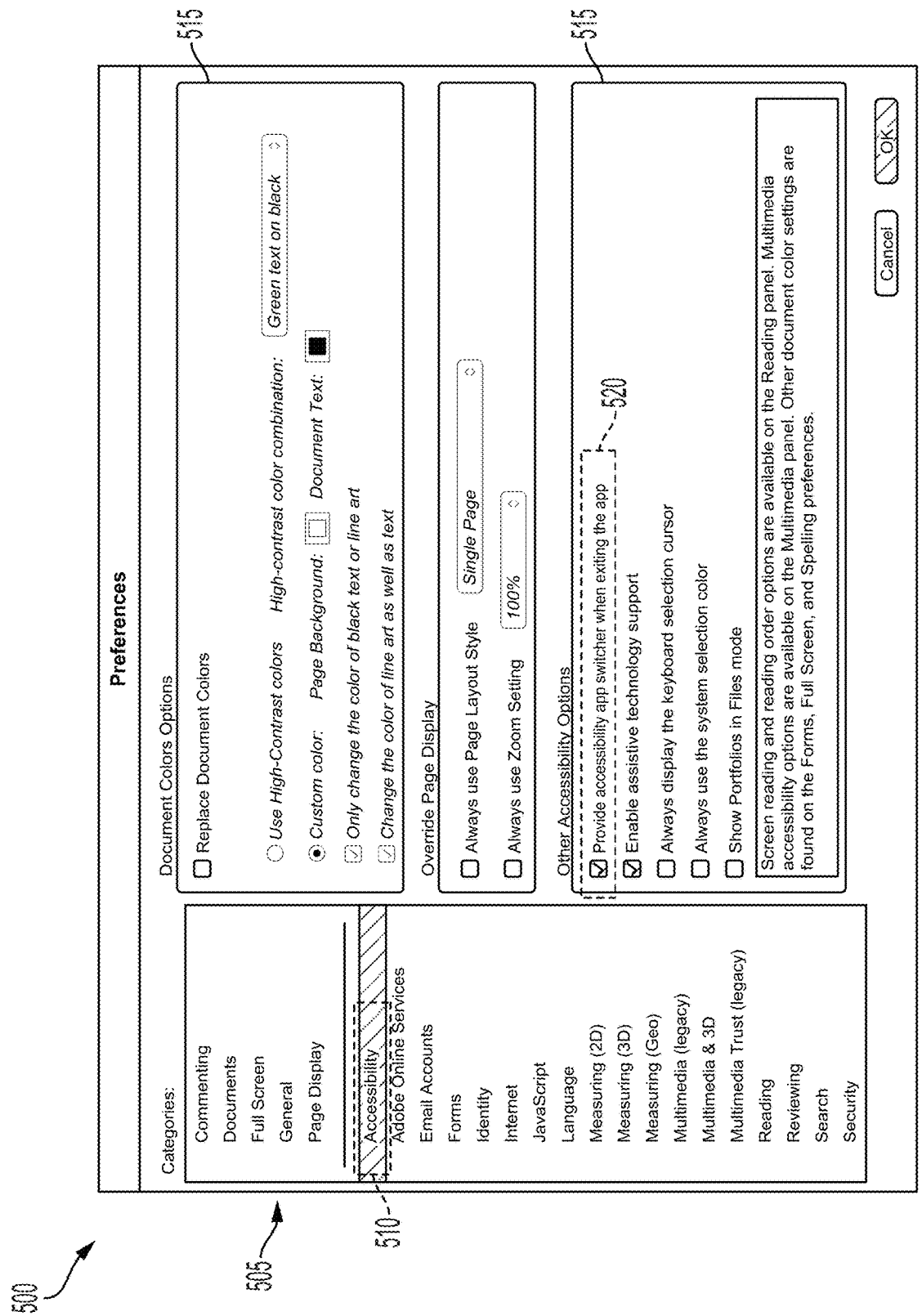
FIG. 5 illustrates a user interface that can be used for accessibility-enabled application switching, according to some aspects of the present disclosure.

In FIG. 5, a typical configuration screen 500 for a PDF reader 160 with a plugin 230 implementing certain aspects of the present disclosure is shown. The configuration screen 500 includes various categories 505 for configuring different subsystems of the PDF reader 160. The accessibility category 510 is selected causing various accessibility-related configuration options 515 to be shown. The inclusion of the plugin 230 has caused control 520 to be included among the options 515. Control 520 is a check box allowing the PDF reader 160 user to select a provision for enabling an accessibility app switcher when exiting the app. Thus, in this example, the detection of the indication of the end of the interaction would be the user exiting the PDF reader 160 by, for example, selecting Quit from a menu or clicking an exit control.

Returning now to the sequence diagram 400 of FIGS. 4A-B, upon receipt of the indication of the end of the interaction, at 465, the context switching subsystem 110 offers a context switch 469 including an offer to return to the chat bot 130, now the source application following the second context switch 439. Context switch 469 may be offered to the user using a dialog similar to the context switch selection dialog 125. At 475, the user elects to remain in the application 220 and at 478 continues to interact with the application. The sequence diagram 400 ends for this path, although additional context switches may still be possible later.

At 470, the user elects to return to the chat bot 130. The context switching subsystem 110 may examine the token 140 to determine which source application to return to on the basis of the requesting target application. For example, if the token 140 includes nested application identifiers, the innermost nested pair of source and target applications may be used. The context switching subsystem 110 may output a command to cause the client device 101 or screen reader 115 to switch back to the chat bot 130. Any additional contextual information included in the token 140 may be used to restore the context of the chat bot 130 to the state it was before the second context switch 439 occurred so that the context switch is as seamless as possible from the standpoint of the user experience.

At 480, the token 140 is updated again. In this example, since nested applications are used, the innermost source/target pair can be "popped" or deleted. In some other examples, the source application may be updated to the application 220 or the web browser 120, depending on the preference of the user. At 485, the user interacts with the chat bot 130 again.

Figure 6:
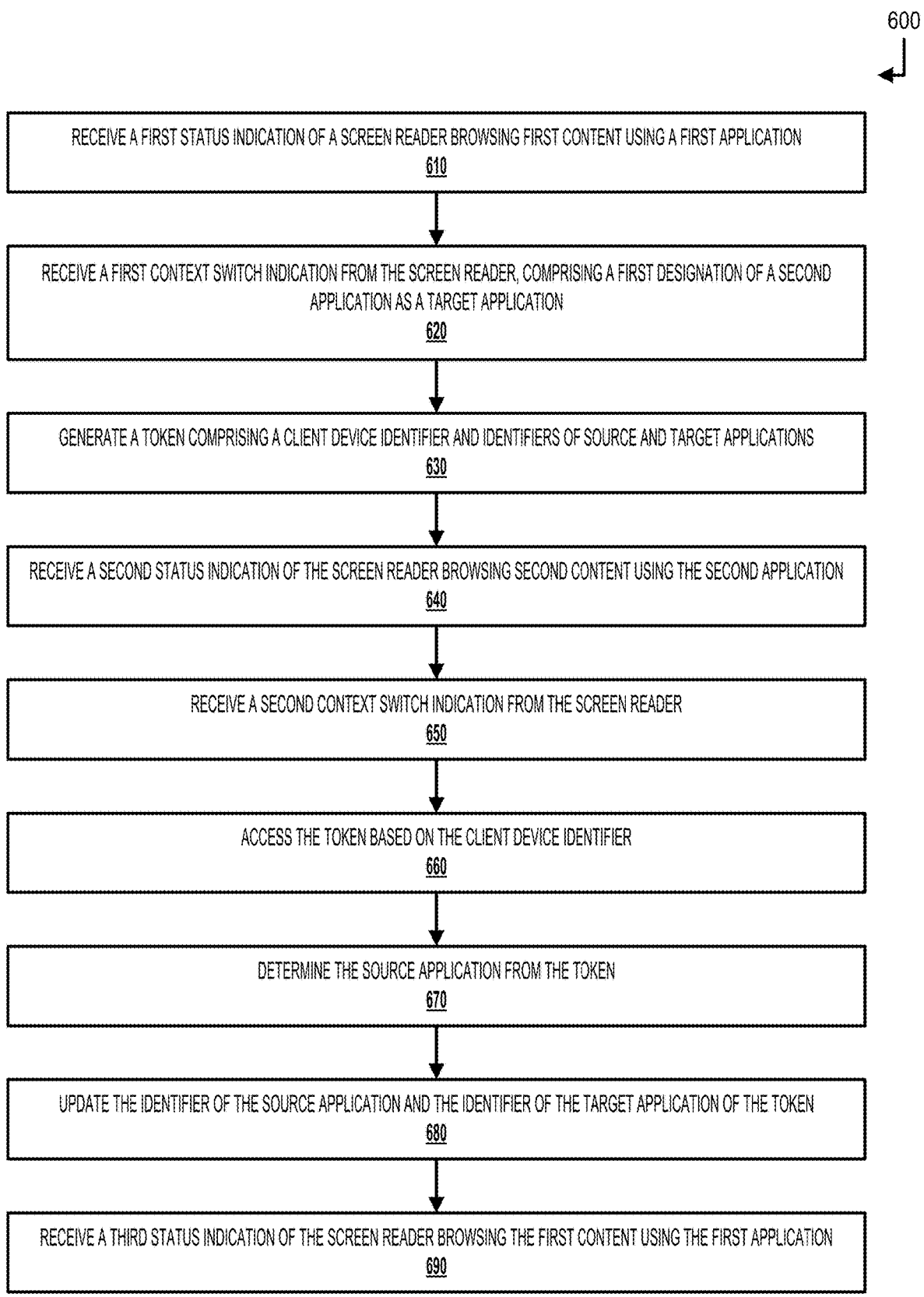
FIG. 6 is a flow diagram of an example process for accessibility-enabled application switching, according to some aspects of the present disclosure.

FIG. 6 is a flow diagram of an example process 600 for accessibility-enabled application switching. The process 600 depicted in FIG. 6 may be implemented in software executed by one or more processing units of a processing device, implemented in hardware, or implemented as a combination of software and hardware. This process 600 is intended to be illustrative and non-limiting. The example process herein is described with reference to the example context switching subsystem 110 depicted in FIGS. 1 and 2, but other implementations are possible. Although FIG. 6 depicts various processing operations occurring in a particular order, the particular order depicted is not required. In certain alternative embodiments, the processing may be performed in a different order, some operations may be performed in parallel, or operations may be added, removed, or combined together.

At block 610, a processing device receives a first status indication of a screen reader 115 browsing content using a first application. For example, a client device 101 may include a screen reader 115 such as JAWS, NVDA, or others. The screen reader 115, which may include context switching subsystem 110 as a subprocess or which may also be a standalone process, may send a signal to the context switching subsystem 110 as the user uses the screen reader 115 for various applications using the provided accessibility features. In this case, the context switching subsystem 110 may receive an indication that the user is browsing a web page 122 using a web browser 120.

At block 620, a processing device receives a first context switch indication from the screen reader 115, including a designation of a second application as a target application, wherein in the first context switch indication is generated by the screen reader 115 based on context switch accessibility code 210. For example, the context switch accessibility code 210 may be JavaScript code in that can detect a screen reader 115 or infer the presence of a screen reader 115 based on contextual clues. The JavaScript code can present the user of the screen reader with a dialog box such as context switch selection dialog 125 that includes a selection control for switching contexts. Following the user's selection, the context switch indication is relayed to the context switching subsystem 110 and may include information identifying client device 101, the source application, the target application, and contextual information about the state of the source application. The contextual information about the state of the source application can be used to restore that state upon later returning.

At block 630, a processing device generates a token 140 including a client device 101 identifier corresponding to the screen reader 115, a source application identifier, and a target application identifier, wherein the source application is the first application, and the target application is the second application. Additionally, the token 140 may further include the contextual information about the state of the source application.

In a typical implementation, such as the example token 300 from FIG. 3, the token 300 may be an alphanumeric string formed by concatenating the client device 101 or screen reader 115 identifier 305, the source application identifier 310, the target application identifier 320, and the additional contextual information about the source application 330. The string may be unencoded text, encoded text (e.g., Base 64 encoding), compressed text, or encrypted or signed text.

In some examples, the token 140 may further include an identifier of a tertiary application that can be used for stored nested context switches. For instance, the token 140 may include a first source application and a first target application following a first context switch. Then, following a second context switch, a tertiary application may be identified as the next target application. In this example, the target application is implicitly the source application of the nested or innermost context switch. Other examples are not limited to tertiary identifiers and may include quaternary identifiers, quinary identifiers, and so on.

Following generation of the token 140, the token 140 may be stored in a component of the context switching subsystem 110 such as the token storage module 280. However, in some examples, the token 140 may also be stored in the web browser 120. For instance, the token 140 may be stored as a cookie or in web browser 120 local storage. In that case, the screen reader 115 may access the token 140 regardless of which application retains the current focus or context.

A command is output to cause the context switch from the first (source) application to the second (target) application. For example, the screen reader 115 or context switching subsystem 110 may output a command to cause the context switch. For example, if the first context switch indication specifies a context switch from the web browser 120 to the chat bot 130, the screen reader 115 or context switching subsystem 110 may use JavaScript code to cause the focus or application context to switch. In some examples, security settings may prevent automatic switching of the context, and additional user input or permissions may be required to complete the context switch.

At block 640, a processing device receives a status indication of the screen reader 115 browsing second content using the second application. Once again, the context switching subsystem 110 may send a signal to the context switching subsystem 110 as the user uses the screen reader 115. In this example, the user is interacting with the chat bot 130 via the screen reader 115.

At block 650, a processing device receives a second context switch indication from the screen reader. For example, in the chat bot 130 example, the chat bot 130 may present an icon or URL that is associated with another application 220 such as a PDF reader 160, video player, music player, word processor, code editor, and so on. The chat bot 130 or other second application may include a configuration setting that includes instructions to send a context selection indication upon occurrence of a predefined event like the sending of the link or URL. The predefined event may be any of numerous possible triggers including, for instance, receipt of an indication to exit the second application.

Following a selection by the user, at block 660, a processing device accesses the token based on the client device identifier. For example, the context switching subsystem 110 may look up the stored token 140 according to an identifier of the client device 101 or screen reader 115. In examples where the token is stored on the client device 101, only a single stored token 140 is typically maintained and so the lookup step may not be necessary. However, in some examples, the context switching subsystem 110 is a program running on an external server that may be storing multiple tokens 140 for multiple users. Additionally, even in the case of local storage, multiple instances of screen readers 115 may be in use as in the case of, for instance, multiple virtual machines running on a single client device 101.

At block 670, a processing device determines the source application from the token. For example, the token 140 may include the source application identifier such as the process ID, executable name, environment variable, URL, tab identifier, state information, and so on. Additional computations may be needed to identify the source application. For example, if the source identifier is a process ID, the context switching subsystem 110 may obtain a process listing for the client device using an API provided by the client device 101 and look up the associated executable.

At block 680, a processing device updates the source application identifier and the target application identifier of the token 140, wherein the source application is the second application, and the target application is the first application. For example, the token processing module 250 of the context switching subsystem 110 may update the identifiers. In this example, the source and target applications are switching: the source application becomes the chat bot 130 and the target application becomes the web browser 120. In some examples, additional information may need to be obtained to complete this step. For example, as in block 670, a process listing may need to be obtained to update the source and target application identifiers.

At block 690, a processing device receives a third indication of the screen reader browsing the first content using the first application. A command is again output to cause the context switch from the second (source) application to the first (target) application. The token 140 may include the additional contextual information about the source application that can be used to restore the state of the source application before the context switch. For instance, if the additional contextual information is the location on a web page 122, the web page 122 may be advanced to this location on the page. The context switching subsystem 110 sends a signal to the context switching subsystem 110 as the user uses the screen reader 115, now back on the web browser 120.

Computing Environment

Figure 7:
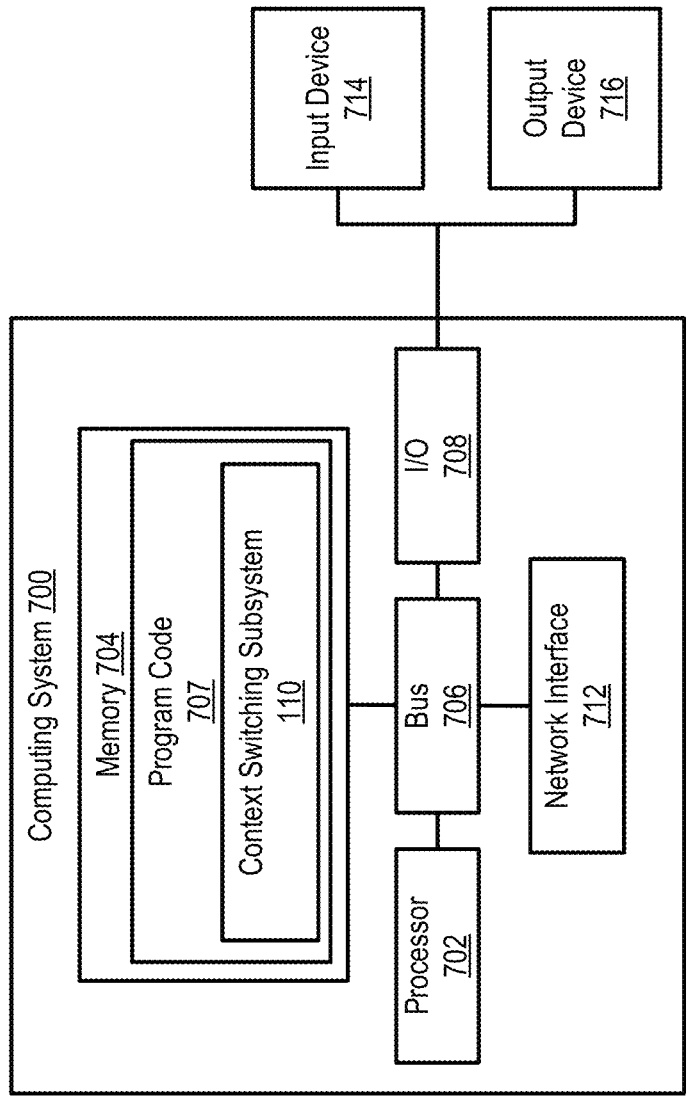
FIG. 7 depicts an example of a computer system that may be suitable for accessibility-enabled application switching, according to some aspects of the present disclosure.

Any suitable computer system or group of computer systems can be used for performing the operations described herein. For example, FIG. 7 depicts an example of a computer system 700. The depicted example of the computer system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing program code 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory device 704 can be volatile memory, non-volatile memory, or a combination thereof.

The computer system 700 executes program code 707 that configures the processor 702 to perform one or more of the operations described herein. Examples of the program code include, in various embodiments, the context switching subsystem 110 of FIG. 1, which may include any other suitable systems or subsystems that perform one or more operations described herein (e.g., one or more ML models, storage systems, controllers, or function-specific modules). The program code 707 may be resident in the memory device 704 or any suitable computer-readable medium and may be executed by the processor 702 or any other suitable processor.

The processor 702 is an integrated circuit device that can execute the program code 707. The program code 707 can be for executing an operating system, an application system or subsystem, or both. When executed by the processor 702, the instructions cause the processor 702 to perform operations of the program code 707. When being executed by the processor 702, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory devices 704 store the program code 707 that includes one or more datasets described herein. In some embodiments, one or more of data sets are stored in the same memory device (e.g., one of the memory devices 704). In additional or alternative embodiments, one or more of the programs, data sets, models, and functions described herein are stored in different memory devices 704 accessible via a data network. One or more buses 706 are also included in the computer system 700. The buses 706 communicatively couple one or more components of a respective one of the computer system 700.

In some embodiments, the computer system 700 also includes a network interface device 712. The network interface device 712 includes any device or group of devices suitable for establishing a wired or wireless data connection to one or more data networks. Non-limiting examples of the network interface device 712 include an Ethernet network adapter, a modem, and/or the like. The computer system 700 is able to communicate with one or more other computing devices via a data network using the network interface device 712.

The computer system 700 may also include a number of external or internal devices, an input device 714, an output device 716, or other input or output devices. For example, the computer system 700 is shown with one or more input/output ("I/O") interfaces 708. An I/O interface 708 can receive input from input devices or provide output to output devices. An input device 714 can include any device or group of devices suitable for receiving visual, auditory, or other suitable input that controls or affects the operations of the processor 702. Non-limiting examples of the input device 714 include a touchscreen, a mouse, a keyboard, a microphone, a separate mobile computing device, etc. An output device 716 can include any device or group of devices suitable for providing visual, auditory, or other suitable sensory output. Non-limiting examples of the output device 716 include a touchscreen, a monitor, a speaker, a separate mobile computing device, etc.

Although FIG. 7 depicts the input device 714 and the output device 716 as being local to the computer system 700, other implementations are possible. For instance, in some embodiments, one or more of the input device 714 and the output device 716 can include a remote client-computing device that communicates with computing system 700 via the network interface device 712 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

General Considerations

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
receiving a first status indication of a screen reader browsing first content using a first application;
receiving a first context switch indication from the screen reader, comprising a first designation of a second application as a target application, wherein in the first context switch indication is generated by the screen reader based on context switch accessibility code;
generating a token comprising a client device identifier corresponding to the screen reader, a source application identifier, and a target application identifier, wherein the source application is the first application, and the target application is the second application;
receiving a second status indication of the screen reader browsing second content using the second application;
receiving a second context switch indication from the screen reader;
accessing the token based on the client device identifier;
determining the source application from the token;
updating the source application identifier and the target application identifier of the token, wherein the source application is the second application, and the target application is the first application; and
receiving a third status indication of the screen reader browsing the first content using the first application.

2. The method of claim 1, wherein the token further comprises contextual information about the source application.

3. The method of claim 2, wherein the token is an alphanumeric string formed by concatenating the client device identifier, the source application identifier, the target application identifier, and the contextual information.

4. The method of claim 1, wherein the first application is a web browser chat application.

5. The method of claim 4, wherein the second application is a PDF reader and the first context switch indication is caused by selection of a PDF in the web browser chat application.

6. The method of claim 5, wherein the second context switch indication from the screen reader is generated in response to a detection of an end of file marker of the PDF.

7. The method of claim 1, wherein the first application is a web browser and the second application is a web browser chat application.

8. The method of claim 1, wherein the token further comprises an identifier of a tertiary application, further comprising:
receiving a third context switch indication from the screen reader, comprising a third designation of a third application as the tertiary application;
accessing the token based on the client device identifier;
updating the identifier of the tertiary application, wherein the tertiary application is the third application; and
receiving a fourth status indication of the screen reader browsing third content using the third application.

9. The method of claim 1, wherein the second application includes a configuration setting comprising instructions to send a context selection indication upon occurrence of a predefined event.

10. The method of claim 9, wherein the predefined event is receiving, by the second application, of an indication to exit the second application.

11. A system comprising:
one or more processors; and
one or more computer-readable storage media storing instructions which, when executed by the one or more processors, cause the one or more processors to perform operations including:
processing context switch accessibility code accessed from a first application using a client device configured to cause a context switch selection;
outputting a first command to cause the context switch selection in the first application;
receiving a first context switch indication comprising a first selection of a second application;
generating a token comprising a client device identifier corresponding to a screen reader, a source application identifier, and a target application identifier, wherein the source application is the first application, and the target application is the second application;
outputting a second command to cause the client device to switch to the second application;
receiving a second indication of a second context selection from the second application comprising a second selection of the first application;
accessing the token based on the client device identifier;
determining the source application from the token;
updating the source application identifier and the target application identifier of the token, wherein the source application is the second application, and the target application is the first application; and
outputting a third command to cause the client device to switch to the first application.

12. The system of claim 11, wherein:
the token further comprises contextual information about the source application; and
the token is an alphanumeric string formed by concatenating the client device identifier, the source application identifier, the target application identifier, the contextual information, and one or more additional application identifiers, wherein the one or more additional application identifiers correspond to nested application selections.

13. The system of claim 12, wherein the contextual information about the source application includes a location within the source application.

14. The system of claim 11, wherein the first application is a web browser and the second application is a web browser chat application.

15. The system of claim 11, wherein:
the first application is a web browser chat application and the second application is a PDF reader; and
the first context switch indication is caused by selection of a PDF in the web browser chat application.

16. The system of claim 11, wherein the second application includes a configuration setting comprising instructions to send a context selection indication upon receiving an indication to exit the second application.

17. A non-transitory computer-readable medium storing instructions that, when executed by one or more processors, cause the one or more processors to perform operations including:
receiving a first status indication of a screen reader browsing first content using a web browser;
receiving a first context switch indication from the screen reader, comprising a first designation of a chat bot as a target application, wherein in the first context switch indication is generated by the screen reader based on context switch accessibility code included in a webpage;
generating a token comprising a client device identifier corresponding to the screen reader, a source application identifier, and a target application identifier, wherein the source application is the web browser, and the target application is the chat bot;
receiving a second status indication of the screen reader browsing second content using the chat bot;
receiving a second context switch indication from the screen reader;
accessing the token based on the client device identifier;
determining the source application from the token;
updating the source application identifier and the target application identifier of the token, wherein the source application is the chat bot, and the target application is the web browser; and
receiving a third status indication of the screen reader browsing the first content using the web browser.

18. The non-transitory computer-readable medium of claim 17, wherein the token further comprises an identifier of a tertiary application, further comprising:
receiving a third context switch indication from the screen reader, comprising a third designation of a PDF reader as the tertiary application;
accessing the token based on the client device identifier;
updating the identifier of the tertiary application, wherein the tertiary application is the PDF reader;
receiving a fourth status indication of the screen reader browsing third content using the PDF reader;
receiving a fifth context switch indication from the screen reader, comprising a fifth designation of the chat bot as the target application;
accessing the token based on the client device identifier; and
updating the source application identifier and the target application identifier of the token, wherein the source application is the PDF reader, and the target application is the chat bot.

19. The non-transitory computer-readable medium of claim 17, wherein the token further comprises contextual information about the source application; and
the token is a base 64 encoded string formed by concatenating the client device identifier, the source application identifier, the target application identifier, the contextual information, and one or more additional application identifiers, wherein the one or more additional application identifiers correspond to nested application selections.

20. The non-transitory computer-readable medium of claim 17, wherein the token is stored in the web browser.

* * * * *